United States Patent [19]

Kalriis-Nielsen et al.

[11] Patent Number: 4,743,422

[45] Date of Patent: May 10, 1988

[54] METHOD FOR MANUFACTURING A SEALING BODY FOR A PIPE JOINT

[76] Inventors: Erling Kalriis-Nielsen, Violvej 5, 8450 Hammel, Denmark; Johannes J. Laarhoven, Scholtensdijk 16, 7771 CV Hardenberg; Johannes H. Beune, Zoom 79, 5061 RB Oisterwijk, both of Netherlands

[21] Appl. No.: 818,830

[22] Filed: Jan. 14, 1986

[30] Foreign Application Priority Data

| | | | |
|---|---|---|---|
| Jan. 14, 1985 | [NL] | Netherlands | 8500073 |
| Jan. 14, 1985 | [NL] | Netherlands | 8500074 |
| May 24, 1985 | [NL] | Netherlands | 8501500 |

[51] Int. Cl.[4] .......... B29C 45/44; B28B 7/10

[52] U.S. Cl. .......... 264/255; 264/318; 264/334; 425/556

[58] Field of Search .......... 264/255, 318, 246, 247, 264/241, 334; 425/556

[56] References Cited

U.S. PATENT DOCUMENTS

| | | | |
|---|---|---|---|
| 2,955,371 | 10/1960 | Brunner | 264/246 |
| 3,475,530 | 10/1969 | Cooper | 264/247 |
| 4,348,348 | 9/1982 | Bennett | 264/255 |
| 4,410,479 | 10/1983 | Cyriax | 264/255 |
| 4,468,367 | 9/1984 | Beune et al. | 264/255 |
| 4,507,258 | 3/1985 | Aoki | 264/255 |

*Primary Examiner*—Jan H. Silbaugh
*Assistant Examiner*—J. Durkin
*Attorney, Agent, or Firm*—A. Robert Theibault

[57] ABSTRACT

A method of manufacture of a sealing body for a pipe joint comprising a retaining ring of thermoplastic material, which is to be fastened on the end portion of a pipe part, and a sealing ring of thermoplastic material, preferably thermoplastic rubber, bonded to the retaining ring. The retaining ring is first moulded by injection moulding and then the sealing ring is moulded by injection molding in a second mould cavity which is partly bonded by a portion of the retaining ring. The first mould cavity is bounded by two mould cavity surfaces movable relative to one another. When the first mould cavity is opened, the retaining ring remains on one mould cavity surface and is subsequently placed back against the other mould cavity surface. During injection moulding of the sealing ring the mould cavity may be sealed at the transitions from the surface portion of the retaining ring to the adjoining mould cavity surfaces by an annular lip and an annular ridge respectively. A sealing ring and a following retaining ring may be moulded practically simultaneously in first and second mould cavities spaced apart in one and the same mould.

6 Claims, 5 Drawing Sheets

METHOD FOR MANUFACTURING A SEALING BODY FOR A PIPE JOINT

BACKGROUND OF THE INVENTION

The invention relates to a method for manufacturing a sealing body, particularly for a pipe joint, comprising a retaining ring of thermoplastic material, which is to be fastened on the end portion of a pipe part, and a sealing ring disposed coaxially to said retaining ring and bonded thereto, one of these elements being previously moulded, after which the other element is moulded in a mould cavity, which is partly bounded by a part of the previously moulded element.

A method of this kind is known.

According to this known method a sealing ring consisting of a head portion and a sealing sleeve is moulded in a first mould cavity bounded by a first, a second and a third mould cavity surface. The portion of the mould cavity for the sealing sleeve is mainly bounded by the first and second mould cavity surfaces and the portion of the mould cavity for the head portion is mainly bounded by the third mould cavity surface. The third mould cavity surface is than replaced by a fourth mould cavity surface and the retaining ring is moulded by injection moulding of the thermoplastic material around the head portion of the sealing ring in a mould cavity bounded by said head portion and the fourth mould cavity surface, the sealing sleeve being confined between the first and second mould surfaces.

This method has a number of drawbacks. The retaining ring must in fact be moulded around the head portion of the sealing ring, which is often made of relatively soft material, so that on the injection of the material of the retaining ring this head portion may be deformed. In addition, the moulded sealing body is difficult to remove from the mould cavity. Moreover, the cycle time for the moulding of the sealing body is relatively long.

SUMMARY OF THE INVENTION

It is the object of the invention to obviate these drawbacks.

This object is attained with a method of the above-mentioned kind, which is characterized in that the retaining ring is first moulded by injection moulding in a first mould cavity bounded by a first outer mould cavity surface and a first inner mould cavity surface, both surfaces being movable in the axial direction of the mould cavity, relative to one another, the first mould cavity is opened, while the moulded retaining ring remains on the first inner mould cavity surface, the retaining ring is removed from the first inner mould cavity surface by means of a stripper means and is placed back against the oppositely situated first outer mould cavity surface, whereupon the sealing ring is moulded in a second mould cavity situated next to the retaining ring and bounded by a part of the surface of the retaining ring, a second inner mould cavity surface, and a second outer mould cavity surface which is movable in the axial direction of the mould cavity relative to the second inner mould cavity surface, the sealing ring thus being bonded to the retaining ring, the second mould cavity is opened, and finally the sealing body is removed from the mould. In this way it is ensured that the sealing ring is moulded in a mould cavity entirely bounded by non-deformable surfaces, so that during the moulding of the sealing ring no deformation of the mould cavity surfaces occurs.

The sealing ring is preferably moulded by injection moulding of a thermoplastic material, particularly a thermoplastic rubber. Expediently the sealing ring is moulded practically simultaneously with a following retaining ring in first and second mould cavities, spaced apart from one another, in one and the same mould, the removal of the sealing body from the mould likewise being effected practically simultaneously with the removal of the second retaining ring from the first inner mould cavity surface and its replacement against the oppositely situated first outer mould cavity surface.

Through these steps the cycle time for moulding the seal is considerably shortened, so that a substantial saving of costs is achieved.

During the opening of the second mould cavity the sealing body can remain on the first outer cavity surface and the second inner mould cavity surface and be removed from these mould cavity surfaces by means of ejector means. This ensures that a moulded sealing body which is itself is non-releasing, can nevertheless be removed from the mould cavity in a simple manner.

Alternatively, the sealing body is carried by the second outer cavity surface, during the opening of the second mould cavity, and removed from this mould cavity surface by means of a stripper means.

The invention further relates to a method for manufacturing a sealing body, particularly for a pipe joint, comprising a retaining ring of thermoplastic material, which is to be fastened to an end portion of a pipe part, and a sealing ring disposed coaxially to said retaining ring and bonded thereto, the retaining ring being previously moulded and the sealing ring being moulded in a mould cavity which is partly bounded by a portion of the surface of the retaining ring, which is characterized in that during the injection moulding of the sealing ring the mould cavity for the sealing ring is sealed, at at least one transition from the surface portion, bounding the mould cavity, of the retaining ring to an adjoining mould cavity surface bounding the mould cavity.

In this way a sealing body of very good quality is obtained, without so-called "butterflies".

These so-called "butterflies" may occur when during injection moulding of the sealing ring, the highly fluid material of the sealing ring, which is injected under very high pressure into the mould cavity, presses away the relatively soft material of the retaining ring at the transition from the retaining ring surface to the adjoining mould cavity surfaces bounding the mould cavity. This is prevented by sealing the mould cavity at said transitions.

The retaining ring is preferably provided with sealing means which during the injection moulding of the sealing ring form a seal with the adjoining mould cavity surface at at least one transition from the surface portion, bounding the mould cavity, of the retaining ring to an adjoining mould cavity surface bounding the mould cavity.

The sealing means preferably comprise at least an annular lip which is disposed at a first transition on the retaining ring and extends in the direction of the sealing ring to be moulded, and which during the moulding of the sealing ring lies against the inner mould cavity surface, and the thickness of which expediently decreases in the direction of the free end, and/or an annular ridge provided on the retaining ring at a second transition and cooperating clampingly during the moulding of the sealing ring with an oppositely situated portion of the outer mould cavity surface, which portion being preferable the outer periphery of a part of a mould, which part is situated inside the retaining ring and bounds the mould cavity.

The invention likewise relates to a sealing body for a pipe joint, comprising a retaining ring of thermoplastic material, whichis to be fastened on the end portion of a pipe part, and a sealing ring disposed coaxailly to said retaining ring and bonded thereto, which sealing body is characterized in that said retaining ring being provided, at a first transition from the surface of the retaining ring to the surface of the sealing ring, with an annular lip which, viewed in a cross-section of the sealing body, extends on the outer periphery of said cross-section of the sealing body in the direction of the sealing ring, the surface of the lip which is situated on the outer periphery, lying preferably in the same plane as the adjoining portion of the surface of the retaining ring, and the thickness of the lip expediently decreases in the direction of its free end, and/or with an annular ridge at a second transition from the surface of the retaining ring to the surface of the sealing ring, which transition, viewed in a cross-section of the sealing body is situated on the inner periphery of said cross-section of the sealing body.

The invention also relates to a mould for manufacturing a sealing body comprising a retaining ring and a sealing ring bonded thereto, this mould being characterized in that it comprises two halves movable relative to one another, one mould half being provided with at least two first outer mould cavity surfaces and two second inner mould cavity surfaces, each first outer mould cavity surface adjoining a second inner mould cavity surface, and the other mould half being provided with at least one first inner mould cavity surface and one second outer mould cavity surface, which surfaces can be positioned coaxially opposite the first outer mould cavity surfaces and the second inner mould cavity surfaces to enclose at least one first mould cavity and one second mould cavity.

In a preferred embodiment of the mould, the two mould halves are rotatable relative to one another about an axis located centrally between the two first outer mould cavity surfaces and the two second inner mould cavity surfaces respectively, and centrally between the first inner mould cavity surface and the second outer mould cavity surface, and extending parallel to the axes of symmetry of the mould cavity surfaces, whereby the first inner mould cavity surface and the second outer mould cavity surface can selectively be positioned opposite one of the first outer mould cavity surfaces and respectively one of the second inner mould cavity surfaces.

Through this construction the time between two successive injection moulding stages can be kept short, which is advantageous in respect of the cycle time. In addition the construction of the mould can be kept relatively simple. The invention will now be explained through the description of an example of embodiment and with reference to the drawing.

BRIEF DESCRIPTION OF THE DRAWING

FIG. 8 is a schematic section through a part of a mould for moulding the sealing body of FIG. 6, in the closed state; and FIG. 9 shows a cross-section through a number of other sealing bodies produced by the method according to the invention.

DETAILED DESCRIPTION OF THE PREFERRED EMBODIMENTS

Figure 1:
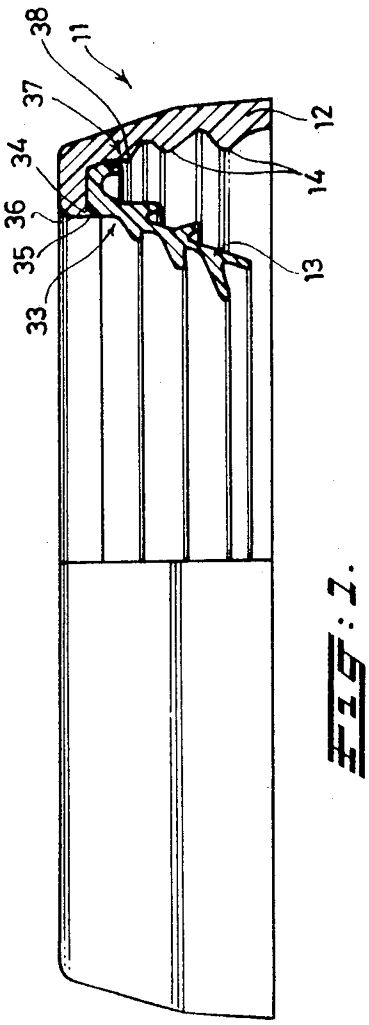
FIG. 1 shows a sealing body produced by the the method according to the invention, partly in cross-section and partly in elevation.

In FIG. 1 a sealing body 11 for a pipe joint is shown which comprises a retaining ring 12 of thermoplastic material, intended to be fastened to an end portion (not shown) of a pipe part, and a sealing ring 13 disposed coaxially to said retaining ring and bonded thereto. The sealing ring 13 preferably consists of a thermoplastic rubber. The retaining ring 12 is provided internally with at least one annular ridge 14, which are adapted to cooperate with a complementarily shaped annular depression on an end portion of a pipe part, for the purpose of fastening a sealing body 11 on the pipe part.

Figure 2:
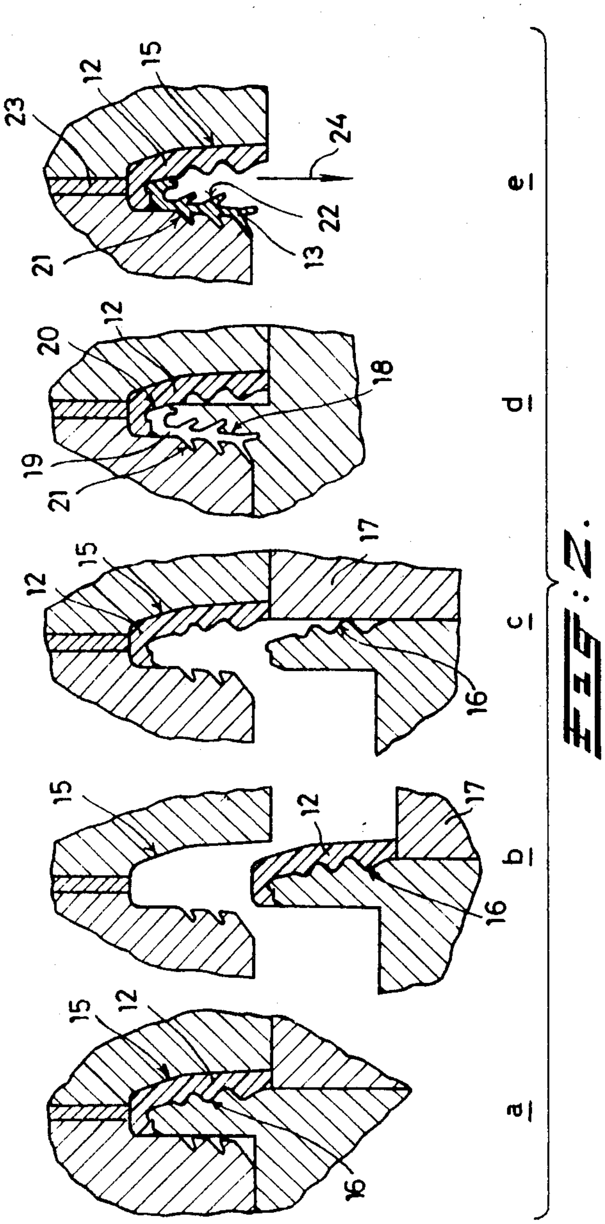
FIG. 2 shows schematically the different phases during the moulding of the sealing body of FIG. 1.

FIG. 2 shows the different phases during the moulding of the sealing body shown in FIG. 1. FIG. 2*a* shows the phase after the retaining ring 12 has been moulded by injection moulding in a first mould cavity bounded by a first outer mould cavity surface 15 and a first inner mould cavity surface 16. The two mould cavity surfaces are movable relative to one another in the axial direction of the mould cavity. The mould cavity is thereupon opened by moving the mould cavity surfaces 15 and 16 away from one another, the moulded retaining ring 12 remaining behind on the first inner mould cavity surface 16, while the outer side of the retaining ring 12 lies free, as shown in FIG. 2*b*. The retaining ring 12 is then removed by stripper means 17 from the first inner mould cavity surface 16 under temporary deformation of said retaining ring, which is then placed back against the first outer mould cavity surface 15 (FIG. 2*c*). By positioning of a second outer mould cavity surface 18 in the manner shown in FIG. 2*d* a second mould cavity 19 is formed for the sealing ring 13, this cavity then being bonded by the second outer mould cavity surface 18, a part 20 of the surface of the retaining ring 12 and a second inner mould cavity surface 21, after which the sealing ring 13 is moulded in the mould cavity 19 by injection moulding, preferably of a thermoplastic material, particularly a thermoplastic rubber. The sealing ring 13 is thereby bonded to the retaining ring 12. The mould cavity 19 is then opened by moving apart the second outer mould cavity surface 18 and the second inner mould cavity surface 21, which surfaces are movable relative to one another in the axial direction of the mould cavity 19, while the sealing body 11 remains on the first outer mould cavity surface 15 and the second inner mould cavity surface 21, and the outer side 22 of the sealing ring 13 lies free (FIG. 2*e*).

Finally, the sealing body 11 is removed from said mould cavity surfaces 15, 21 in the direction of the arrow 24 in FIG. 2e by means of ejector means 23 movable in the axial direction of the sealing body 11, this being possible because the sealing ring 13 is made of flexible material.

Figure 3:
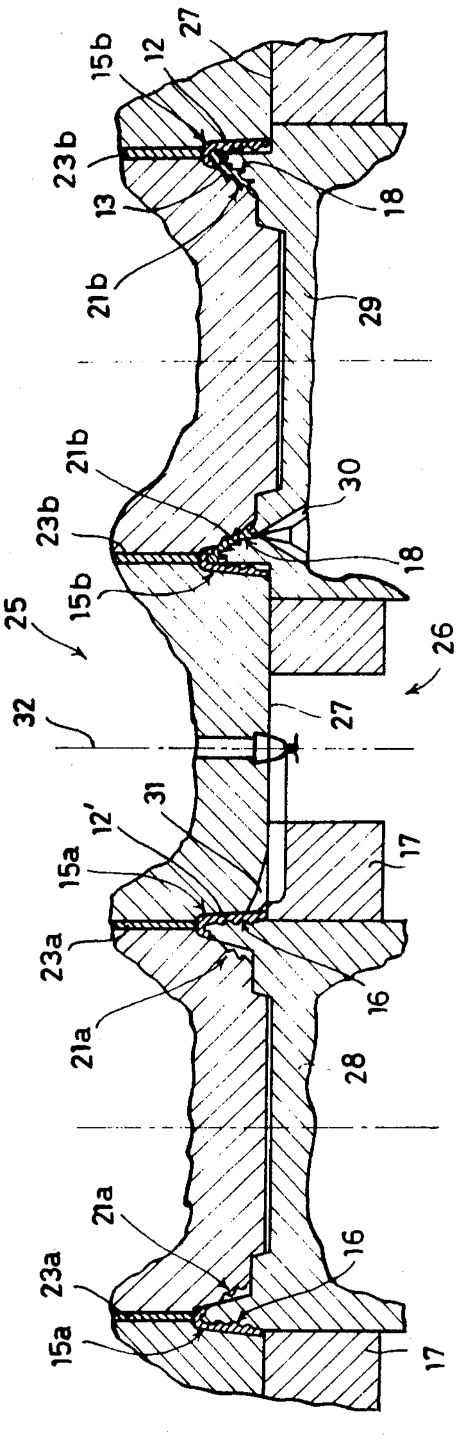
FIG. 3 is a schematic section through a part of a mould for moulding the sealing body of FIG. 1, in the closed state.

FIG. 3 shows in a schematic section through a part of the mould for moulding the sealing body 11, in the closed position. The mould comprises two halves 25 and 26, which are separated from one another by a parting line 27. In one mould half are provided at least two first outer mould cavity surfaces 15a and 15b and two second inner mould cavity surfaces 21a and 21b, each first outer mould cavity surface 15a, 15b adjoining a second inner mould cavity surface 21a, 21b respectively, as can be seen in FIG. 3 and also in FIG. 2, as well as ejector means 23a and 23b movable in the axial direction relative to the mould half 25. In the other mould half 26 are provided at least one first inner mould cavity surface 16 and a second outer mould cavity surface 18 on the mould parts 28 and 29 respectively, as well as a stripper means 17 movable in the axial direction over the mould part 28. The two mould halves 25 and 26 are rotatable, relative to one another, about an axis 32 located centrally between the two first outer mould cavity surfaces 15a, 15b and the second inner mould cavity surfaces 21a, 21b respectively, and centrally between the first inner mould cavity surface 16 and the second outer mould cavity surface 18, and extending parallel to the axes of symmetry of the mould cavity surfaces. The mould cavity surfaces 15a, 15b, 21a, 21b in the mould half 25 can be positioned coaxially opposite the mould cavity surface 16 and 18 in the mould half 26 in order to enclose a first mould cavity and a second mould cavity for the retaining ring 12' and the sealing ring 13 respectively, as shown in FIG. 3.

A sealing ring can thus be moulded practically simultaneously with a following retaining ring 12' in first and second mould cavities spaced apart in one and the same mould.

The material for the sealing ring 13 and the retaining ring 12' can be fed through separate injection moulding sprues 30 and 31 respectively into the mould.

After a sealing ring 13 and a retaining ring 12' have been moulded practically simultaneously in the closed mould, and the sealing ring 13 has been bonded to the previously moulded retaining ring 12, the mould halves 25 and 26 are moved apart in the axial direction of the mould cavities, and then practically simultaneously the sealing body 11 is removed from the mould by means of the ejector means 23b and the retaining ring 12' is removed from the first inner mould cavity surface 16 by means of stripper means 17 and placed back against the first outer mould cavity surface 15a. The mould halves 25 and 26 are then rotated over an angle of 180 degrees about the axis 32, relative to one another, until the first inner mould cavity surface 16 comes to lie coaxially opposite the first outer mould cavity surface 15b and the second outer mould cavity surface 18 comes to lie coaxially opposite the first outer mould cavity surface 15a with the retaining ring 12' and the second outer mould cavity surface 21a, whereupon the mould is closed again and the next retaining ring and sealing ring are moulded.

In FIG. 1 is also shown that at a first transition 33 from the surface of the retaining ring 12 to the surface of the sealing ring 13 the retaining ring 12 is provided with an annular lip 34 extending in the direction of the sealing ring 13. The surface 35 of the lip 34, situated on the outer periphery of the cross-section of the sealing body 11, lies substantially in the same plane as the adjoining portion 36 of the surface of the retaining ring 12. The thickness of the lip 34 decreases in the direction of its free end.

At a second transition 37 from the surface of the retaining ring 12 to the surface of the sealing ring 13 the retaining ring 12 is provided with an annular ridge 38.

Figure 4:
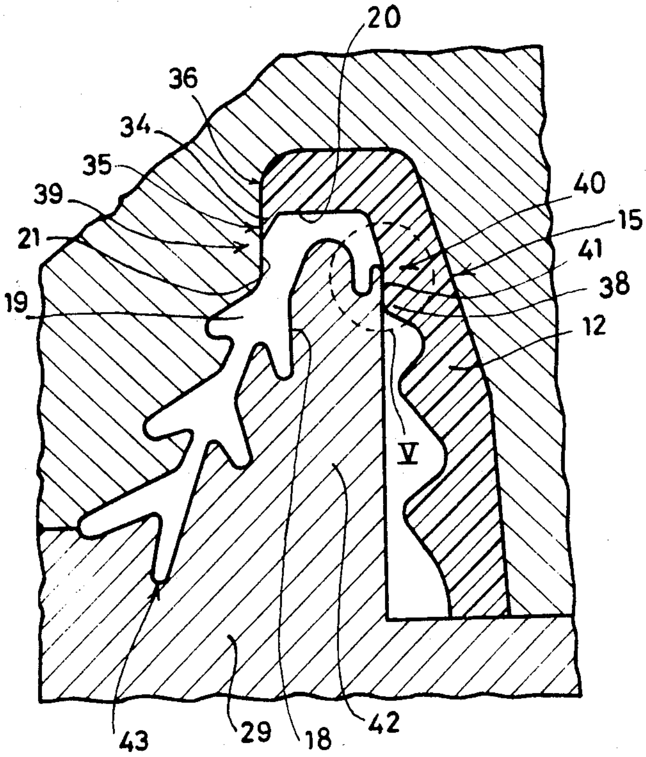
FIG. 4 corresponds to FIG. 2*d*, on an enlarged scale.

FIG. 4 is a cross-section of the mould cavity 19 for the sealing ring 13 of the sealing body 11. The mould cavity 19 is bounded by a portion 20 of the surface of the previously moulded retaining ring 12, which is placed against the mould cavity surface 15 and is further bounded by the inner mould cavity surface 21 and the outer mould cavity surface 18 on the mould part 29 which is situated partly inside the retaining ring 12. The retaining ring 12 is provided with sealing means 34, 38 in the form of an annular lip 34 and an annular ridge 38, which during the injection moulding of the sealing ring 13 cooperate to form a seal with an inner and outer mould cavity surface 21 and 18 respectively of the mould cavity 19 at the transitions 39, 40 respectively from the surface portion 20, bounding the mould cavity 19, of the retaining ring 12 to an adjoining mould cavity surface 21 and 18 respectively bounding the mould cavity 19.

At the transition 39 from the surface portion 20 of the retaining ring 12 to the mould cavity surface 21, the outer wall 35 of the lip 34 lies against the mould cavity surface 21.

Figure 5:
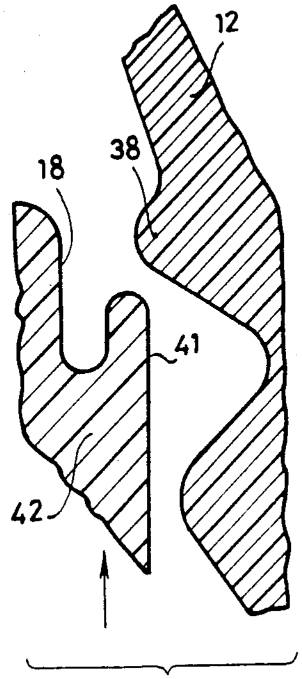
FIG. 5 shows the region V of FIG. 4, on a more enlarged scale, with a not completely closed mould cavity.

At the transition 40 from the surface portion 20 of the retaining ring 12 to the mould cavity surface 21, the annular ridge 38 lies clampingly against the oppositely situated outer periphery 41 of that part 42 of the mould part 29 which lies inside the retaining ring (see also FIG. 5).

Because of the above mentioned sealing means 34, 38 good sealing is effected at the transitions 39, 40 during the injection under high pressure of the highly liquid material of the sealing ring into the mould cavity 19. Particularly when the gate is situated at the end 43 of the mould cavity 19, the lip 34 is pressed against the mould cavity surface 21 through the action of the material flowing in at high speed, so that very good sealing is achieved at the transition 39.

It will be appreciated that the application of the sealing means at the transitions 39, 40 is not restricted to the case wherein a retaining ring 12 is moulded immediately prior to the moulding of a sealing ring 13. The sealing means may be equally applied in the case wherein a retaining ring 12 is pre-moulded in another mould, at another time, and is placed into a mould for moulding the sealing ring 13 onto the retaining ring 12.

Figure 6:
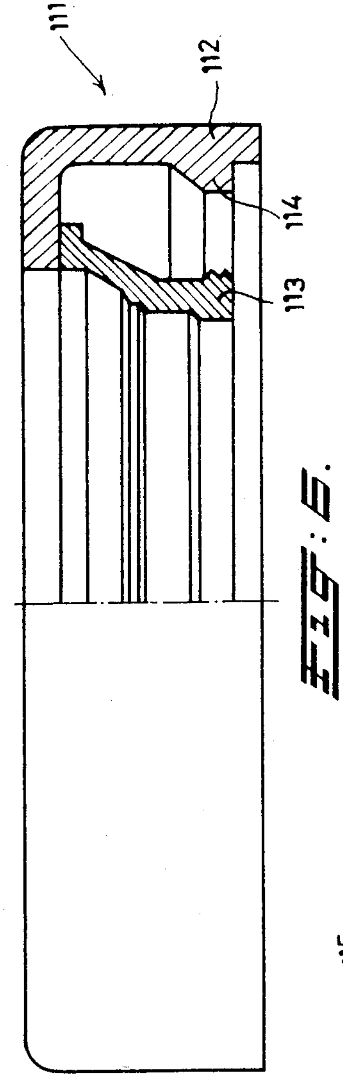
FIG. 6 shows another sealing body produced by the method according to the invention, partly in cross-section and partly in elevation.

FIG. 6 shows another sealing body 111 produced by the method according to the invention. Like the sealing body 11 of FIG. 1, this sealing body also comprises a retaining ring 112 of thermoplastic material and a sealing ring 113, preferably consisting of thermoplastic rubber, but the shape is different.

Figure 7:
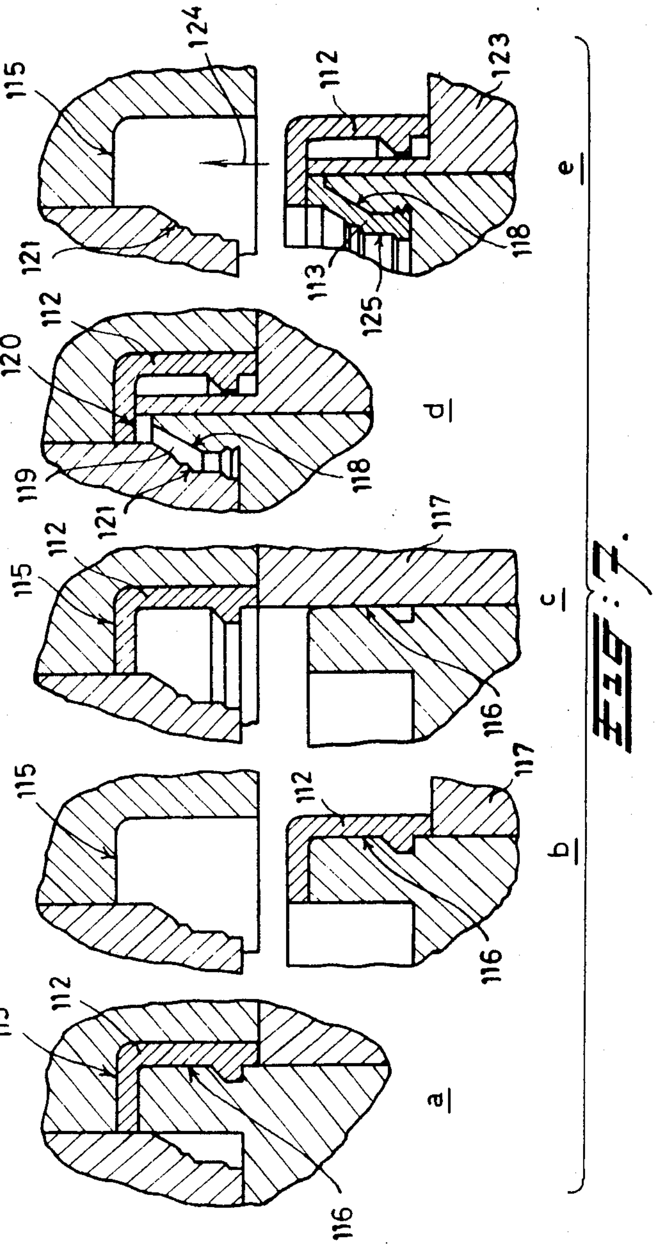
FIG. 7 shows schematically the different phases during the moulding of the sealing body of FIG. 6.
Figure 6:
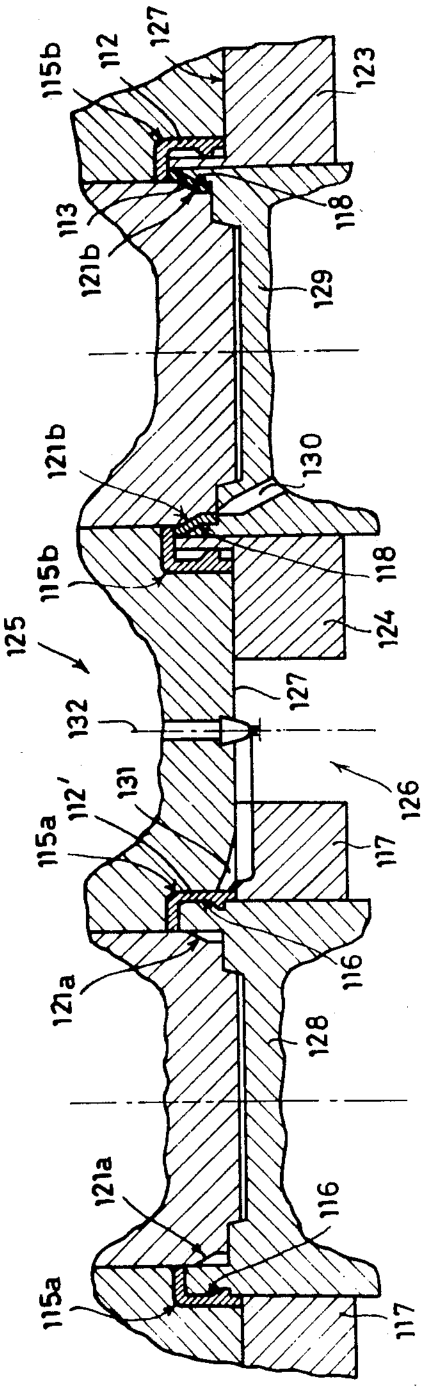
Figure 5:
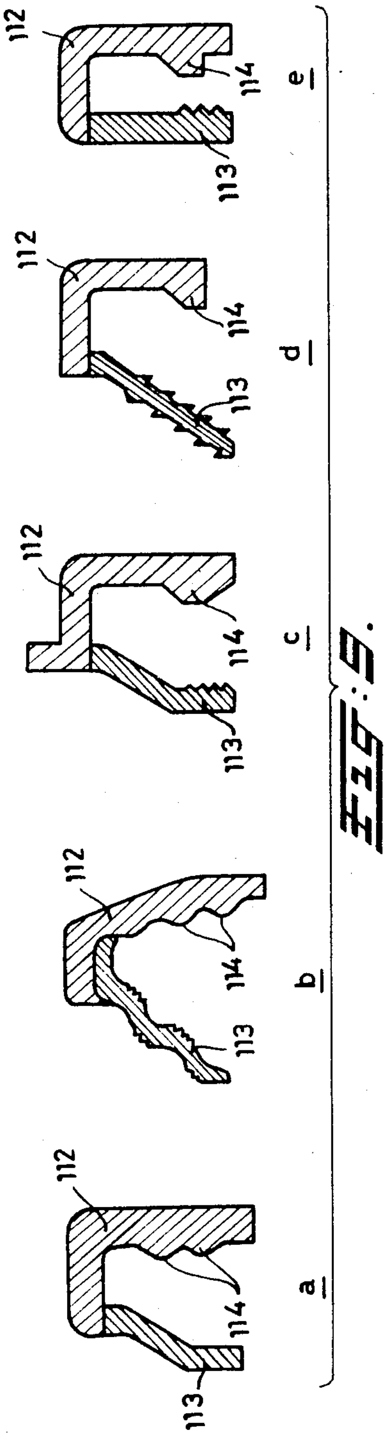

FIG. 7 shows the different phases during the moulding of the sealing body 111, while FIG. 8 shows a part of the mould for moulding the sealing body 111.

FIGS. 6, 7 and 8 are similar to FIGS. 1, 2 and 3 respectively. The different parts in FIGS. 6, 7 and 8 have the same reference numbers as the corresponding parts in FIGS. 1, 2 and 3 with the prefix "1".

The method for manufacturing the sealing body 111 of FIG. 6 is the same as for the sealing body 11 of FIG. 1, as described before, except the last phase, i.e. the removal of the finished sealing body from the mould. This is because the sealing body 111 of FIG. 6 is in itself releasing from the upper mould half 125.

In FIG. 7*e* is shown that during the opening of the second mould cavity the sealing body 111 is carried by the second outer mould cavity surface 118, and the inner side 125 of the sealing ring 113 lies free.

Finally, the sealing body 111 is removed from the mould cavity surface 118 in the direction of the arrow 124 in FIG. 7*e* by means of a stripper means 123 moveable in the axial direction of the sealing body 111, this being possible because the sealing ring 113 is made of flexible material.

The mould shown in FIG. 8 for moulding the sealing body of FIG. 6 differs from the mould of FIG. 3 in that the mould comprises a stripper means 123 moveable in axial direction over a mould part 129 in the lower mould half 126. When after a sealing ring 113 and a retaining ring 112' have been moulded practically simultaneously, the mould halves 125 and 126 are moved apart and then the sealing body 111 is removed from the cavity surface 118 by means of the stripper means 124 practically simultaneously with the removal of the retaining ring 112' from the first inner mould cavity surface 116 and its replacement against the first outer mould cavity surface **115*a***.

FIG. 9 shows a number of other sealing bodies comprising a retaining ring 112 and a sealing ring 113 bonded thereto, which may be produced by the method according to the invention. As is shown in FIG. 9 both the retaining ring 112 and the sealing ring 113 may have different shapes. The sealing bodies shown in FIGS. 6 and 9 all have in common that they can be removed from the upper mould half 125 without deformation. In other words each sealing body is in itself releasing relative to the mould cavity surfaces 115, **115*a*, 115*b* and 121, 121*a*, 121*b***.

It will be clear that the remaining rings 112 of the sealing bodies 111 of FIGS. 6 and 9 may also be provided with sealing means 34 and/or 38 at one and/or both transitions 33, 37 from the surface of the retaining ring 112 to the surface of the sealing ring 113.

With the method and mould described it is possible to produce sealing bodies comprising a retaining ring and a sealing ring bonded to one another, in a very expedient manner and with relatively short cycle times, and of a very high quality without the so-called "butterflies" of sealing ring material at the transitions from the retaining ring to the sealing ring.

It is obvious that in order to increase the rate of production it is possible to produce simultaneously two or more sealing bodies instead of one in the same mould provided with the appropriate number of first and second mould cavities.

It will also be clear that the method and the mould according to the invention are not restricted to the embodiments described in the example, and that, in addition to the sealing bodies described in the example many other forms of composite sealing bodies, in which a sealing ring is bonded to a retaining ring in accordance with the present invention, can also be produced.

What is claimed is:

1. Method for manufacturing a sealing body, particularly for a pipe joint, comprising a retaining ring of thermoplastic material, which is to be fastened on the end portion of a pipe part, and a sealing ring disposed coaxially to said retaining ring and bonded thereto, which method comprises the following steps moulding the retaining ring by injection moulding in a first mould cavity bounded by a first portion of a first mould part surface defining the outer surface of the retaining ring and a second mould part surface defining the inner surface of the retaining ring, opening the first mould cavity by moving part the first and second mould part surfaces in axial direction, while the moulded retaining ring remains on the second mould part surface, removing the retaining ring from the second mould part surface by means of a stripper means and placing it back against the first portion of the first mould part surface which is still situated axially opposite the second mould part surface, replacing the second mould part surface by a third mould part surface and forming a second mould cavity situated next to the retaining ring and bounded by a portion of the surface of the retaining ring, a second portion of the first mould part surface and the third mould part surface, moulding the sealing ring in the second mould cavity, the sealing ring thus being bonded to the retaining ring, opening the second mould cavity, and removing the sealing body from the mould.

2. Method according to claim 1, wherein the sealing ring is moulded by injection moulding from a thermoplastic material, particularly a thermoplastic rubber.

3. Method according to claim 1, wherein during moulding of the sealing ring in the second mould cavity a following retaining ring is moulded in another first mould cavity in one and the same mould, but spaced apart from the second mould cavity.

4. Method according to claim 1, wherein during removal of the sealing body from the mould a following retaining ring is removed from another second mould part surface and replaced against another first mould part surface, which is situated opposite the other second mould part surface.

5. Method according to claim 1, wherein during the opening of the second mould cavity the sealing body remains on the first mould part surface and the sealing body is removed from this mould part surface by means of ejector means.

6. Method according to claim 1, wherein during the opening of the second mould cavity the sealing body is carried by the third mould part surface and the sealing body is removed from this mould part surface by means of a stripper means.

* * * * *